(12) United States Patent
Mahaffey et al.

(10) Patent No.: US 8,573,810 B2
(45) Date of Patent: Nov. 5, 2013

(54) DUAL IN FOCUS GOBO

(75) Inventors: Russel B Mahaffey, Highland Village, TX (US); Breck M. Outland, Dallas, TX (US); David A. Friedersdorff, Flower Mound, TX (US)

(73) Assignee: Production Resource Group, LLC, New Windsor, NY (US)

( * ) Notice: Subject to any disclaimer, the term of this patent is extended or adjusted under 35 U.S.C. 154(b) by 358 days.

(21) Appl. No.: 12/686,308

(22) Filed: Jan. 12, 2010

(65) Prior Publication Data

US 2011/0170072 A1 Jul. 14, 2011

(51) Int. Cl.
*B60Q 1/14* (2006.01)

(52) U.S. Cl.
USPC .......................................................... 362/283

(58) Field of Classification Search
USPC ......... 362/268, 282, 283, 284, 293, 319, 322, 362/324
See application file for complete search history.

(56) References Cited

U.S. PATENT DOCUMENTS

| 2002/0075685 A1* | 6/2002 | Rasmussen et al. | .......... 362/282 |
| 2006/0146520 A1* | 7/2006 | Vitense et al. | ................ 362/153 |

OTHER PUBLICATIONS

Gobo Rotator, Gobo Changer, and Motion Effects, Jun. 4, 2008.*
Rosco Double Gobo Rotator, Feb. 25, 2008.*

* cited by examiner

*Primary Examiner* — Francis M Legasse, Jr.
*Assistant Examiner* — Bao-Luan Le
(74) *Attorney, Agent, or Firm* — Law Office of Scott C. Harris, Inc.

(57) ABSTRACT

A gobo holder with two gobos that are rotatable one relative to the other. The gobos are located with their patterned surfaces facing one another and very close to one another so that both can be in focus at the same time.

26 Claims, 3 Drawing Sheets

DUAL IN FOCUS GOBO

BACKGROUND OF THE INVENTION

Modern automated theatrical spotlights are capable of projecting images and patterns of light onto a stage area and its scenic elements to create textures and effects which enhance the staged production. The origin of these patterns are usually small glass disks having the imagery encoded into a metalized or other coating on one side of the glass. These patterned disks are known as gobos in the lighting industry. The gobos are typically mounted in holders that are then fitted around the periphery of a motorized wheel allowing the lighting system operator to select one pattern for projection from the multiple images available on the wheel. The gobo patterns may be abstract silhouette patterns, gray scale photorealistic images or colored patterns and images.

In advanced automated luminaires, and in order to further enhance the gobo effect, gobo holders may be made with gear teeth which are then individually mounted in bearings. This allows the patterns to be rotated to a particular orientation or spun continuously at a given speed. This rotational control allows the operator to orient a corporate logo for example, to a specific angle for projection or to continuously rotate a projected pattern providing a dynamic effect on a backdrop or on the stage floor. This rotational control may be provided by a second motorized system that has a central sun gear rotationally mounted at the center of the gobo wheel such as described in our application Ser. No. 11/777,006. The sun is rotationally connected to the individual planet gobos by meshing gear teeth. When the sun gear is rotated by its driving motor, all of the planet gobos mounted on the wheel rotate concomitantly. Such a system is known as a rotating gobo mechanism.

The extent of projected effects may be further enhanced if the automated luminaire is fitted with two or more rotating gobo wheels. When two gobo images on separate wheels are aligned along the optical path in the light beam, the operator may change focus using the projection lens. At one time, the operator causes the focus to be on the first image. The operator then commands the lens to slowly move so that the focus shifts to the second image. The effect is such that the first image gradually morphs or dissolves into the second providing a smooth and pleasant change.

Modern theatrical projection systems employ fast projection lens systems which are required in order to deliver high light intensity levels to the stage. Fast lenses, described as having a low f-number, inherently have a shallow depth of focus. Therefore, the images of gobos mounted on two different wheels cannot be in focus at the same time. Only objects occupying essentially the same plane may be projected in focus together. This limitation prevents the operator from projecting two focused and overlapping images which is a desirable effect.

SUMMARY

An embodiment describes enabling the projection of two focused and overlapping gobo images while allowing one of the images to be rotated with respect to the other. One embodiment rotates using a gobo wheel sun gear to rotate gobos.

Another embodiment projects moiré effects created by superimposing two transparent layers containing correlated opaque patterns. (def. from line moiré, *Wikipedia*) When one of the patterns is rotated with respect to the other, a third pattern or set of patterns appears to move within the superimposed images creating unusual animated effects heretofore unattainable using gobo projections. These effects are referred to herein as "animated gobo" effects.

Yet another embodiment uses a retrofit technique, where the animated gobo device becomes compatible with existing rotating gobo mechanisms. Existing operational automated spotlights can be retrofitted to include this kind of system. In one embodiment, the animated gobos using the disclosed construction may occupy the same volume as a standard single rotating gobo and employ the same mounting means.

DETAILED DESCRIPTION

Figure 1:
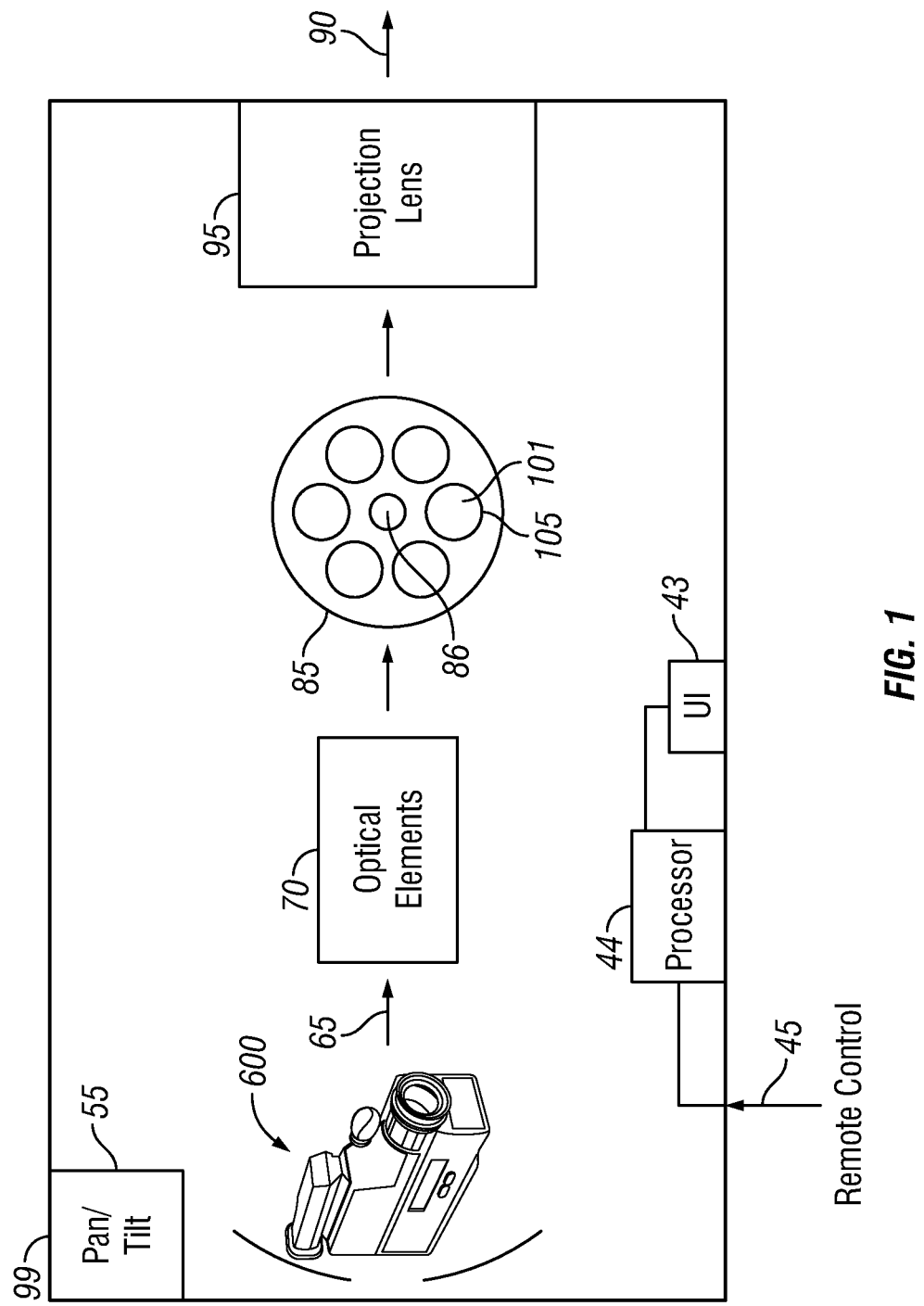
FIG. 1 shows a block diagram of a luminaire.

FIG. 1 illustrates a block diagram of a luminaire which includes the techniques of the present application and the dual gobo wheel. The luminaire 99 is in the housing 100, which may include pan and tilt motors shown generically as 55 that allow moving the housing in both the pan and tilt directions to point at a desired spot. The luminaire 99 also includes a lamp assembly 60 which may include a high-intensity bulb with reflector. In an embodiment, the bulb produces an output which requires a light output from the luminaire shown as 90, of at least 1000 lumen.

The light is projected by the light source 60 along an optical axis as 65. Various optical elements, shown generically as 70, can be located along the optical axis. The optical elements can include gobos, analog dimmers, color changers, lenses, as well as other such elements. A special gobo assembly 85 with two closely-located gobo elements, is specifically shown in addition to the other optical elements 70. The gobo assembly 85 has gobos 101 which are rotatable into the position of the optical axis 65, and then are rotatable via a central sun gear 86 once in the optical axis.

A projection lens 95 focuses the light output 90. Projection lenses are well known, and may include one or more different lens elements and may also carry out a zoom function.

Figure 2:
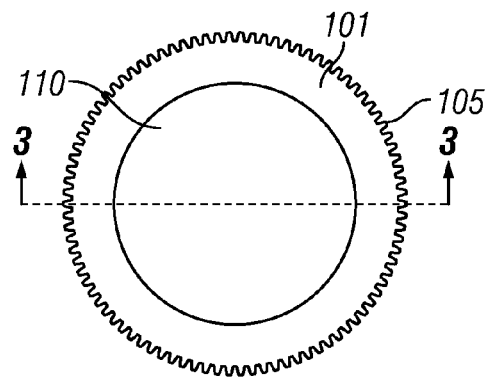
FIG. 2 shows a top view of a gobo holder and FIG. 3 shows a cross section along the line A-A in FIG. 2.

FIG. 2 illustrates detail about the special gobo 89 one of the gobos used according to an embodiment. FIG. 2 shows a top view of the gobo holder, from the projection lens side 91 of the embodiment. First gobo holder 101 has outer surfaces which has associated planet gear teeth 105 that forms one of a set of planetary gears for a rotating gobo wheel assembly of the type described herein, and in our copending application.

The gobo holder 101 holds two different gobos: a first gobo 110 and a second gobo 125. The two gobos overlap as described herein.

Figure 3:
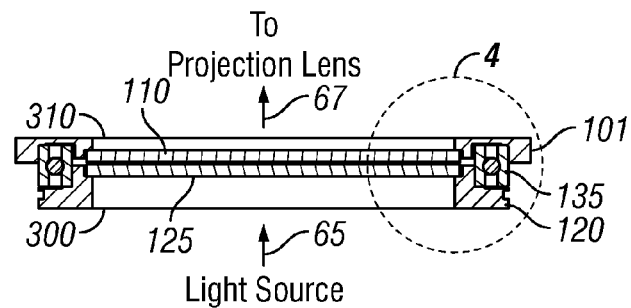
Figure 4:
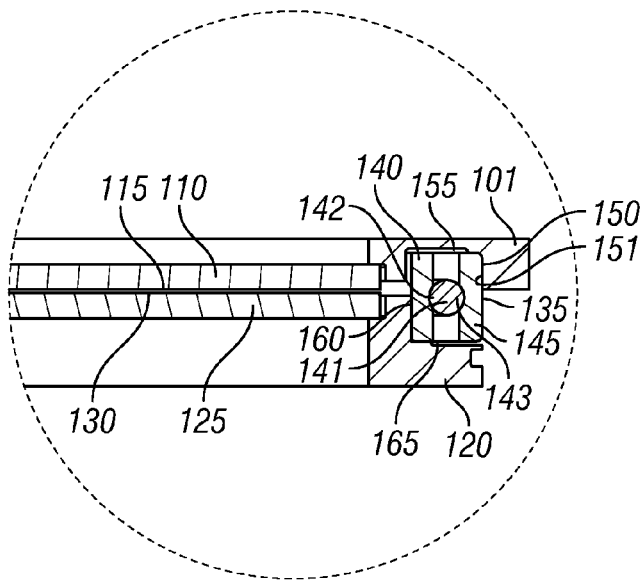
FIG. 4 shows a detail of the rotation portion of the gobo holder.

FIG. 3 shows a cross sectional view along the line A-A of FIG. 2. FIG. 4 shows a detail of a side section of the gobo assembly which shows the overall construction of the assembly.

FIG. 3 shows the gobo holder 101 and its orientation. A first side 300 of the holder 101 faces the light source and receives the light 65 from the light source 60. The second side 310 of the gobo holder faces to the projection lens 75.

The holder 101 mounts first gobo 110 using an adhesive bond. First gobo 110 has a gobo coating 115 which is patterned to contain the image information. In one embodiment, the pattern material can be a dichroic coating. The pattern 115 is on the side of the gobo 110 which is oriented facing away from the projection lens 75, and is facing toward the second gobo 125.

A second gobo holder 120 adhesively mounts a second gobo 125 oriented with its coated and patterned side 130 toward the projection lens and facing toward the first gobo, and adjacent the patterned side 115 of the first gobo 110. The orientation of the two gobos and the construction of the holders places the two coated and image containing surfaces 115, 130 in very close proximity to each other. In an embodiment, the patterned surfaces may be within a distance of less than the thickness of the gobo substrate, more preferably within a distance less than 1/10 of the thickness of the gobo substrate. In one embodiment, this may form a gap between coated sides of between 0.001 and 0.005 inches (and a typical gobo glass thickness is around 0.044 inches). The gap may be as large as 0.01 inches, provided that the lens system can keep both gobo portions at once. The coatings are so close together that, from a projection optic's perspective, they are seen and projected as if they lie in the same plane. Therefore, both images of the gobos may be projected in sharp focus. The gobos therefore may optically interact and interfere with one another, thereby producing special effects which are not possible with single gobo systems. This may create, for example, moiré effects and others. Half tone gobos can enhance the interference effect.

Each gobo is mounted on a ball bearing. FIG. 4 shows first ball bearing formed of an inner race 140 and an outer race 145 separated by balls 141 captured in grooves 142, 143 on the inside facing surfaces of the races 140, 145 respectively. The inner and outer races 140 and 145 are therefore free to rotate with respect to each other.

Mechanical features of the gobo holder 101 ensure that the outer race 145 of bearing 135 is a press fit into the inside diameter of the undercut groove 151 on the bottom side of holder 101. The interface between the two components is surface 150. Relief groove 155 allows clearance above the inner race 140 so that it may turn freely and independently without interference from holder 101.

Analogously, the mechanical features of gobo holder 120 ensure that the inner race 140 of bearing 135 is a press fit onto the outside diameter of gobo holder 120. The interface between these two components is surface 160. Relief step 165 in the flange of holder 120 allows the outer race of the bearing to turn without interference from the holder.

Figure 5:
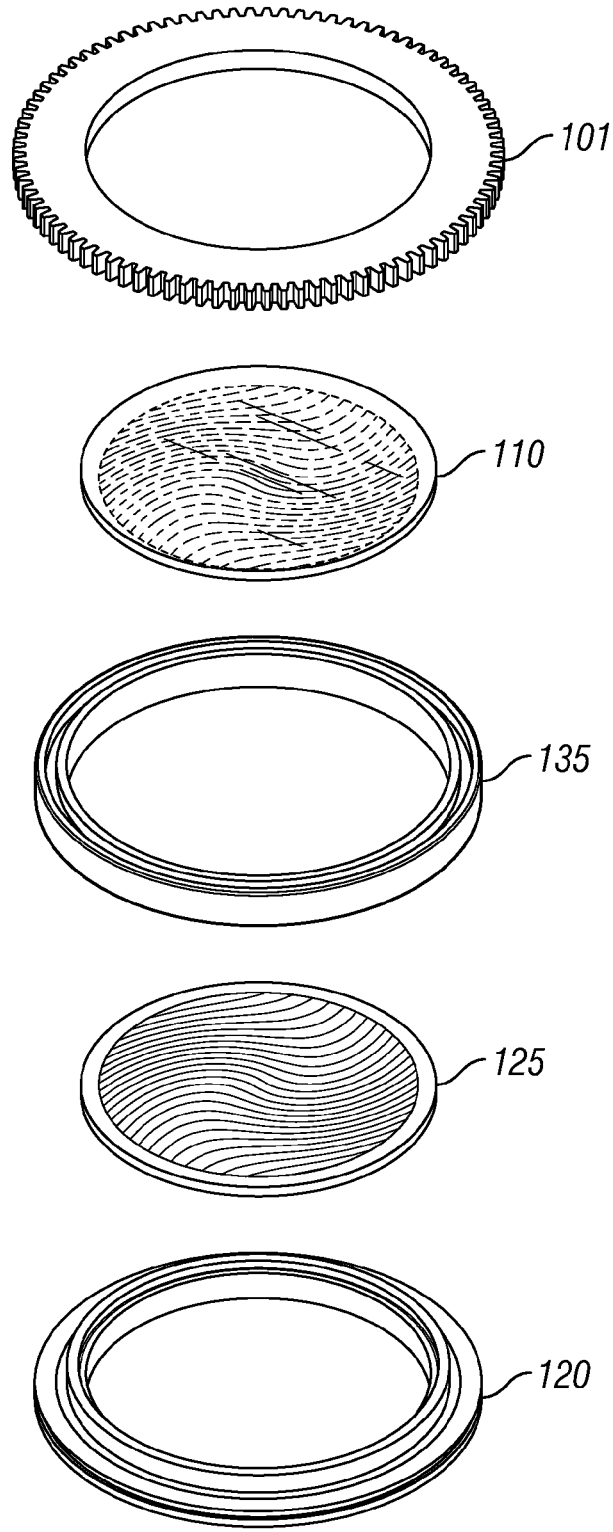
FIG. 5 shows an exploded view of the parts marking up the gobo, and how these parts are used to make the gobo.

FIG. 5 shows an exploded view of the parts of the gobo, and how they are assembled. The assembly process for the animated gobo holder proceeds as follows. First, the two gobos are mounted into their respective holders using a suitable adhesive while ensuring that the coated image containing surfaces are properly oriented so that they will be facing each other in the final assembly. FIG. 5 shown the gobo 110 mounted in the gobo holder 135, and the gobo 125 mounted in the holder 120.

Next, bearing 135 is pressed onto holder 120 employing the press fit between its inner race and the outside diameter of 120.

Finally, holder 101 is pressed onto the outer race of bearing 135 employing the press fit between its outer race and the inside diameter of holder 101. The two holders are thus free to rotate with respect to each other while the spacing between the two gobo image planes is held to a designed minimum having exacting tolerances.

The animated gobo assembly now is ready to be installed in a rotating gobo wheel mechanism using the unique features that the various automated luminaire manufacturers use to mount their gobo holders. Those having ordinary skill in the art understand how to use these features.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other this can be used with two separate toothed outer wheels, so that each gobo can be separately controlled. Also, only one of the gobos need be rotatable relative to the gobo holder, so that the orientation of the two gobos is adjustable one relative to the other. The above describes the gobo holder being rotated by a central sun gear, however, individual rotation motors can be used to rotate the gobo holder, or other techniques such as belts can be used to rotate the gobo holder.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The system described herein can be controlled by any kind of computer, either general purpose, or some specific purpose computer such as a workstation. The computer may be a Pentium class computer, running Windows XP or Linux, or may be a Macintosh computer. The computer may also be a handheld computer, such as a PDA, cell phone, or laptop. The computer can be a console that controls the processor 44 in the assembly 99, over a remote control line 45, e.g. via DMX 512. There may be a user interface 43 that also controls this operation.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A gobo assembly, comprising:
   a gobo holder, having first surfaces for mounting said gobo holder in a luminaire and having a first gobo holding surface holding a first gobo, and said gobo holder having a second gobo holding surface holding a second gobo,
   said first gobo holding surface having a first rotatable part that rotates said first gobo relative to said second gobo, and relative to said gobo holder, where said wherein said first gobo has a gobo pattern on a pattern surface of said first gobo, and said second gobo has an independent gobo pattern on a pattern surface of said second gobo, wherein said pattern surface of said first gobo faces to said pattern surface of said second gobo, and is separated therefrom by a distance of less than 0.005 inches.

2. The gobo assembly as in claim 1, wherein said second gobo holding surface having a second rotatable part, which rotates said second gobo relative to said gobo holder, wherein said first and second gobos are separately rotatable relative to one another and relative to said gobo holder, where said first rotatable part includes an inner race formed of a first flat surface, said second rotatable part includes an outer race formed of a second flat surface, wherein said first flat surface of said inner race faces said second flat surface of said outer race, wherein said inner race is rotationally inside said outer race, and where each of said first and second flat surfaces include a ball shaped indentation therein, and further comprising a ball bearing rotator located between said inner race and said outer race.

3. A gobo assembly as in claim 1, wherein said pattern surface of said first gobo faces to said pattern surface of said second gobo, and is separated therefrom by a distance of less than 0.001 inches.

4. The gobo assembly as in claim 1, wherein said patterned surfaces are formed of patterned dichroic material.

5. The gobo assembly as in claim 2, wherein first and second flat surfaces each extend in a direction perpendicular to a direction of movement of said gobos and are each longer in total distance than a total thickness between outer surfaces of said first and second gobos as mounted.

6. The gobo assembly as in claim 2, wherein said gobo holder has a rotating surface on an outside of said gobo holder which receives rotational force.

7. The gobo assembly as in claim 2, wherein said gobo holder has a first surface which defines a first rotation for said first gobo and the second surface that defines a second rotation for said second gobo.

8. The gobo assembly as in claim 6, wherein said rotating surface is a toothed outer surface.

9. The gobo assembly as in claim 7, wherein said first surface and said second surface both press fit against said gobo holder.

10. The gobo assembly as in claim 7, wherein said first surface and said second surface use a ball bearing formed from a same ball bearing.

11. A gobo assembly, comprising:
a gobo holder, having first surfaces for mounting said gobo holder in a luminaire, said gobo holder holding a first gobo with a patterned gobo surface, and a second gobo with a second patterned surface, with said patterned surface of said first gobo facing said patterned surface of said second gobo, and with a distance separating said patterned surface of said first and second gobo which is less than a thickness of either of said first or second gobos, and where said gobo holder includes a first flat surface, connected to said first gobo, said first flat surface being substantially flat with an indentation area for a ball therein, and said flat surface oriented substantially perpendicular to the patterned gobo surface, and said gobo holder also includes a second flat surface, connected to said second gobo, said second flat surface also being flat with an indentation area for a ball therein and facing and parallel to said first flat surface, and a ball bearing held between said indentation area of said first flat surface and said indentation area of said second flat surface, and guiding rotation between said first flat surface and said second flat surface.

12. The gobo assembly as in claim 11, wherein said patterned surface of said first gobo faces to said pattern surface of said second gobo, and is separated therefrom by a distance of less than 0.005 inches.

13. The gobo assembly as in claim 11, wherein first and second flat surfaces each extend in a direction perpendicular to a direction of movement of said gobos and are each longer in total distance than a total thickness between outer surfaces of said first and second gobos as mounted.

14. The gobo assembly as in claim 11, wherein said gobo holder has a rotating surface on an outside of said gobo holder which receives rotational force.

15. The gobo assembly as in claim 11, wherein said pattern surfaces are formed of patterned dichroic material.

16. The gobo assembly as in claim 11, wherein said gobo holder has a first surface which defines a first rotation for said first gobo and the second surface that defines a second rotation for said second gobo.

17. The gobo assembly as in claim 14, wherein said rotating surface is a toothed outer surface.

18. The gobo assembly as in claim 16, wherein said first surface and said second surface both press fit against said gobo holder.

19. The gobo assembly as in claim 16, wherein said first surface and said second surface use a ball bearing formed from a same ball bearing.

20. A gobo assembly, comprising:
a gobo holder, having first surfaces for mounting said gobo holder in a luminaire, said gobo holder holding at least a first gobo with a patterned gobo surface, and said gobo holder having a first gobo holding surface having a first rotatable part that allows said first gobo to be rotated relative to said gobo holder, said gobo holder also rotatable relative to said luminaire;
a controllable rotation part that rotates said gobo holder relative to said luminaire;
a second gobo with a second patterned surface, where a relative rotation amount between said first and second gobos is set by said first rotatable part, where said patterned surface of said first gobo facing said patterned surface of said second gobo, and with a distance separating said patterned surface of said first and second gobo which is less than a thickness of either of said first or second gobos wherein both said first gobo is rotatable relative to said gobo holder, and said gobo holder is rotatable relative to said luminaire, wherein said second gobo is also rotatable relative to said gobo holder, and where said gobo holder is coupled to a first flat surface, connected to said first gobo, said first flat surface being substantially flat with an indentation area for a ball therein, and said flat surface oriented substantially perpendicular to the patterned gobo surface, and said gobo holder also includes a second flat surface which is coupled to said second gobo, said second flat surface also being flat with an indentation area for a ball therein and facing and parallel to said first flat surface, and a ball bearing held between said indentation area of said first flat surface and said indentation area of said second flat surface, and guiding rotation between said first flat surface and said second flat surface.

21. The gobo assembly as in claim 20, where said wherein said first gobo has a gobo pattern on a pattern surface of said first gobo, and said second gobo has an independent gobo pattern on a pattern surface of said second gobo, wherein said pattern surface of said first gobo faces to said pattern surface of said second gobo, and is separated therefrom by a distance of less than 0.005 inches.

22. The gobo assembly as in claim 20, wherein first and second flat surfaces each extend in a direction perpendicular to a direction of movement of said gobos and are each longer in total distance than a total thickness between outer surfaces of said first and second gobos as mounted.

23. The gobo assembly as in claim 20 wherein said gobo holder has a rotating surface on an outside of said gobo holder which receives rotational force from said controllable rotation part.

24. The gobo assembly as in claim 22, wherein said pattern surfaces are formed of patterned dichroic material.

25. The gobo assembly as in claim 23, wherein said rotating surface is a toothed outer surface.

26. The gobo assembly as in claim 25, wherein said controllable rotation part is a central sun gear that rotates said toothed outer surface.

\* \* \* \* \*